(12) United States Patent
Scopesi et al.

(10) Patent No.: US 12,187,368 B2
(45) Date of Patent: Jan. 7, 2025

(54) STEERING JOINT ASSEMBLY

(71) Applicant: DANA ITALIA S.R.L., Trentino (IT)

(72) Inventors: Marco Scopesi, Arco (IT); Luca Gambini, Arco (IT); Andrea Bortoli, Arco (IT); Davide Deimichei, Arco (IT); Fabrizio Denei, Arco (IT)

(73) Assignee: DANA ITALIA S.R.L., Trentino (IT)

( * ) Notice: Subject to any disclaimer, the term of this patent is extended or adjusted under 35 U.S.C. 154(b) by 0 days.

(21) Appl. No.: 18/348,223

(22) Filed: Jul. 6, 2023

(65) Prior Publication Data

US 2024/0010272 A1 Jan. 11, 2024

(30) Foreign Application Priority Data

Jul. 8, 2022 (DE) ............ 20 2022 103 859.7

(51) Int. Cl.
*B62D 7/18* (2006.01)
*B60B 27/00* (2006.01)

(52) U.S. Cl.
CPC ............ *B62D 7/18* (2013.01); *B60B 27/0036* (2013.01)

(58) Field of Classification Search
CPC ..... B62D 7/18; B60B 27/0036; B60B 35/128; B60K 17/306
See application file for complete search history.

(56) References Cited

U.S. PATENT DOCUMENTS

| 2,685,184 | A | * | 8/1954 | De Nador | ............ B60K 17/306 464/171 |
| 3,253,670 | A | * | 5/1966 | Thomas | ............... B60K 17/306 180/254 |
| 3,255,838 | A | * | 6/1966 | Goldman | ............... B60K 17/30 180/254 |
| 4,801,178 | A | * | 1/1989 | Sasa | ..................... B60K 17/306 180/259 |
| 5,195,605 | A | * | 3/1993 | Wood | .................. B60K 17/306 280/124.156 |
| 2003/0011160 | A1 | * | 1/2003 | Bodin | ...................... B62D 7/18 280/93.512 |
| 2009/0003743 | A1 | * | 1/2009 | Voisine | ............... F16C 33/1085 384/322 |
| 2018/0281540 | A1 | * | 10/2018 | Gordon | ................ B62D 27/023 |
| 2021/0188351 | A1 | * | 6/2021 | Aste | ......................... B62D 7/18 |
| 2022/0041213 | A1 | * | 2/2022 | Aste | ......................... B62D 7/18 |
| 2023/0294765 | A1 | * | 9/2023 | Sellers | ..................... B62D 7/18 403/135 |

* cited by examiner

*Primary Examiner* — Karen Beck
(74) *Attorney, Agent, or Firm* — McCoy Russell LLP

(57) ABSTRACT

The present disclosure relates to a steering joint assembly comprising an axle beam, a first king pin rigidly mounted on the axle beam, a steering knuckle, and a first spherical plain bearing rotatably connecting the first king pin to the steering knuckle.

19 Claims, 1 Drawing Sheet

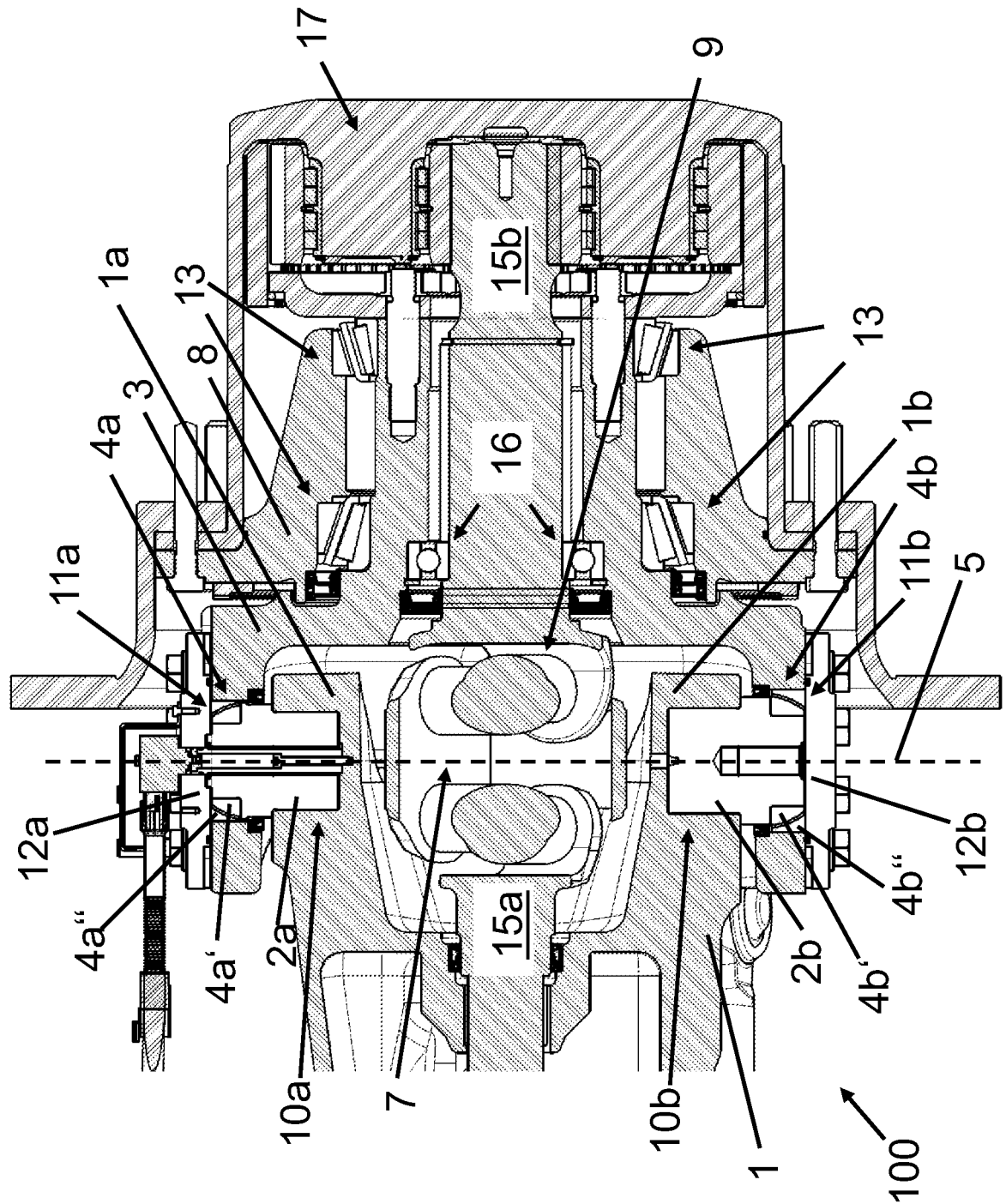

STEERING JOINT ASSEMBLY

CROSS-REFERENCE TO RELATED APPLICATION

The present application claims priority to German Utility Model Application No. 20 2022 103 859.7, entitled "STEERING JOINT ASSEMBLY", and filed on Jul. 8, 2022. The entire contents of the above-listed application is hereby incorporated by reference for all purposes.

TECHNICAL FIELD

The present document primarily relates to a steering joint assembly for an automotive vehicle. Joint assemblies of this type may be used in heavy duty off-highway vehicles such as agricultural tractors, earth moving vehicles such as wheel loaders, excavators or dumpers, or mining equipment, for example.

BACKGROUND AND SUMMARY

Known steering joint assemblies for steering axles include a steering knuckle rotatably connected to an axle beam via a pair of king pins. Typically, the king pins are fixedly mounted on the steering knuckle and rotatably connected to the axle beam. However, in applications where the steering axle needs to withstand high loads, these traditional king pin layouts may at times not resist the high strains which may be put on them. This may be of relevance for agricultural tractors with steered rear axles, for example, where heavy implements are typically attached to the rear of the vehicle.

Thus, there is demand for a steering joint assembly capable of withstanding high loads.

This problem is solved by a joint assembly such as described herein.

The presently proposed steering joint assembly comprises an axle beam, a first king pin rigidly mounted on the axle beam, a steering knuckle, and a first spherical plain bearing rotatably connecting the first king pin to the steering knuckle.

With respect to the above-described traditional king pin layouts, the presently proposed steering joint assembly allows moving the first spherical plain bearing rotatably connecting the first king pin to the steering knuckle further away from a second joint between the axle beam and the steering knuckle. In this way, a maximum load applicable to a steering axle of a given size or dimension may be increased without compromising the functionality of the steering axle.

The steering joint assembly may further comprise a second king pin rigidly mounted on the axle beam, and a second spherical plain bearing rotatably connecting the second king pin to the steering knuckle. A spherical portion of the first spherical plain bearing connected to the first king pin and a spherical portion of the second spherical plain bearing connected to the second king pin may then face away from one another along a steering axis defined by the first king pin and the second king pin.

The first king pin may be rigidly mounted on a first mounting portion of the axle beam and the second king pin may be rigidly mounted on a second mounting portion of the axle beam. A clearance may be formed in between the first mounting portion and the second mounting portion along a steering axis defined by the first king pin and the second king pin so that a joint may pass through the clearance.

The steering joint assembly may further comprise a wheel hub rotatably mounted on the steering knuckle, and a joint such as a universal joint or a constant velocity joint drivingly engaged with the wheel hub for transferring torque to the wheel hub. The joint may be disposed within or may pass through the clearance formed in between the first mounting portion and the second mounting portion of the axle beam.

Spherical portions of the first spherical plain bearing and/or spherical portions of the second spherical plain bearing may be coated with or may comprise a coating including polytetrafluorethylene (PTFE), for example. PTFE-coated spherical plain bearings typically require a low degree of maintenance.

The first king pin may be rigidly mounted in a first blind hole formed in the axle beam, and/or the second king pin may be rigidly mounted in a second blind hole formed in the axle beam. A king pin rigidly mounted in a blind hole may withstand high loads.

The first spherical plain bearing may be disposed in a first through hole formed in the steering knuckle, and/or the second spherical plain bearing may be disposed in a second through hole formed in the steering knuckle. Mounting or disposing the first and/or the second spherical plain bearing in a first and/or second through hole formed in the steering knuckle may facilitate assembly of the bearings.

An outer ring of the first spherical plain bearing and/or an outer ring of the second spherical plain bearing may be connected to the steering knuckle. For instance, the outer rings may be screwed or press-fit to the steering knuckle.

The steering joint assembly may further comprise a first cover plate rigidly connected to the steering knuckle and covering the first through hole formed in the steering knuckle, and/or a second cover plate rigidly connected to the steering knuckle and covering the second through hole formed in the steering knuckle. An outer ring of the first spherical plain bearing may then be connected or additionally connected to the first cover plate, and/or an outer ring of the second spherical plain bearing may then be connected or additionally connected to the second cover plate.

An embodiment of the presently proposed steering joint assembly is described in the following detailed description and is depicted in the accompanying FIGURE.

BRIEF DESCRIPTION OF THE FIGURE

FIG. 1 schematically shows a sectional view of an embodiment of a steering joint assembly of the presently proposed type.

DETAILED DESCRIPTION

FIG. 1, drawn to scale although other relative dimensions may be used, schematically shows a sectional view of a steering joint assembly 100. For example, the steering joint assembly 100 may be installed on an off-highway vehicle such as a tractor, a harvester, a wheel loader, a dumper, a wheeled excavator, a mining vehicle, or the like. The steering joint assembly 100 includes an axle housing or axle beam 1, a first king pin 2a and a second king pin 2b rigidly mounted on the axle beam 1, and a steering knuckle 3 rotatably connected to the axle beam 1 via the king pins 2a, 2b and via a first spherical plain bearing 4 and a second spherical plain bearing 4b, respectively. The king pins 2a, 2b are aligned with and define a steering axis 5. Here, the steering axis 5 extends in a vertical direction. The steering knuckle 3 may be rotated relative to the axle beam 1 with respect to the steering axis 5. A wheel hub 8 is rotatably mounted on the steering knuckle 3 via bearings 13. A wheel may be mounted on the wheel hub 8. Torque may be transmitted to the wheel hub 8 and via a first shaft 15a housed within the axle beam 1, and via a second shaft 15b. The second shaft 15b is rotatably supported on the steering knuckle 3 via bearings 16. The shafts 15a, 15b are drivingly connected via a joint 9. The joint 9 may include a universal joint or a constant velocity joint, for example. Typically, the second shaft 15b is drivingly connected to the wheel hub 8 via a reduction drive 17. The reduction drive 17 may include one or more planetary gear sets, for example.

The first king pin 2a is rigidly mounted in a first blind hole 10a formed in the axle beam 1. For example, the first king pin 2a may be press-fit into the first blind hole 10a. However, it is understood that in other embodiments the first king pin 2a may be rigidly mounted in the first blind hole 10a by other means such as via a threaded connection. Mounting the first king pin 2a in the first blind hole 10a may improve the stability of the design and may allow higher loads to be placed on the first king pin 2a.

The first spherical plain bearing 4a which rotatably connects the first king pin 2a to the steering knuckle 3 includes a spherical inner ring 4a' mounted on the first king pin 2a, and a spherical outer ring 4a" mounted on the steering knuckle 3. More specifically, the inner ring 4a' of the first spherical plain bearing 4a has a convex shape, and the outer ring 4a" has a corresponding concave shape. The inner ring 4a' is received in the outer ring 4a" in a form-fit or positive fit. The inner ring 4a' and the outer ring 4a" may rotate relative to one another. Typically, the inner ring 4a' and the outer ring 4a" are made of a metal such as steel. Here, the contact surfaces of the inner ring 4a' and of the outer ring 4a" are coated with a coating including or made of polytetrafluorethylene (PTFE). PTFE-coated spherical plain bearings require no or almost no additional lubrification. Therefore, they may be maintained at low cost.

The first spherical plain bearing 4a is disposed in a first through hole 11a extending through the steering knuckle 3 along the steering axis 5. On a side of the steering knuckle 3 averted from the axle beam 3 the first through hole 11a is covered or closed by a first cover plate 12a. The first cover plate 12a is rigidly connected to the steering knuckle 3, for example via screws or bolts. A surface of the outer ring 4a" arranged in parallel to the steering axis 5 is received in the first through hole 11a and is mounted on and connected to a portion of the steering knuckle 3 enclosing the first through hole 11a. In this way, the steering knuckle 3 may absorb horizontal loads exerted on the steering knuckle 3 through the first king pin 2a via the outer ring 4a". And a surface of the outer ring 4a" arranged perpendicular to the steering axis is mounted on and connected to the first cover plate 12a. In this way, the first cover plate 12a may absorb vertical loads exerted on the first cover plate 12a through the first king pin 2a via the outer ring 4a".

The second king pin 2b is rigidly mounted in a second blind hole 10b formed in the axle beam 1. For example, the second king pin 2b may be press-fit into the second blind hole 10b. However, it is understood that in other embodiments the second king pin 2b may be rigidly mounted in the second blind hole 10b by other means such as via a threaded connection. Mounting the second king pin 2b in the second blind hole 10b may improve the stability of the design and may allow higher loads to be placed on the second king pin 2b.

The second spherical plain bearing 4b which rotatably connects the second king pin 2b to the steering knuckle 3 includes a spherical inner ring 4b' mounted on the second king pin 2a, and a spherical outer ring 4b" mounted on the steering knuckle 3. More specifically, the inner ring 4b' of the second spherical plain bearing 4b has a convex shape, and the outer ring 4b" has a corresponding concave shape. The inner ring 4b' is received in the outer ring 4b" in a form-fit or positive fit. The inner ring 4b' and the outer ring 4b" may rotate relative to one another. Typically, the inner ring 4b' and the outer ring 4b" are made of a metal such as steel. Here, the contact surfaces of the inner ring 4b' and of the outer ring 4b" are coated with a coating. The coating may include or may be made of polytetrafluorethylene (PTFE), for example. PTFE-coated spherical plain bearings require no or almost no additional lubrification. Therefore, they may be maintained at low cost.

The second spherical plain bearing 4b is disposed in a second through hole 11b extending through the steering knuckle 3 along the steering axis 5. On a side of the steering knuckle 3 averted from the axle beam 3 the second through hole 11b is covered or closed by a second cover plate 12b. The second cover plate 12b is rigidly connected to the steering knuckle 3, for example via screws or bolts. A surface of the outer ring 4b" arranged in parallel to the steering axis 5 is received in the second through hole 11b and is mounted on and connected to a portion of the steering knuckle 3 enclosing the second through hole 11b. In this way, the steering knuckle 3 may absorb horizontal loads exerted on the steering knuckle 3 through the second king pin 2b via the outer ring 4b". And a surface of the outer ring 4b" arranged perpendicular to the steering axis 5 is mounted on and connected to the second cover plate 12b. In this way, the second cover plate 12b may absorb vertical loads exerted on the second cover plate 12b through the second king pin 2b via the outer ring 4h".

The king pins 2a, 2b are mounted on the axle beam 1 in such a way that the spherical inner ring 4a' of the first spherical plain bearing 4a connected to the first king pin 2a and the spherical inner ring 4b' of the second spherical plain bearing 4b connected to the second king pin 2b point away from each other along the steering axis 5. Or, equivalently, the open portions of the blind holes 10a, 10b formed in the axle beam 1 in which the king pins 2a, 2b are received face away from each other along the steering axis 5. The steering knuckle 3 at least partially encloses the axle beam 1 along the steering axis 5. More specifically, the portions of the steering knuckle 3 enclosing the through holes 11a, 11b enclose the mounting portions 1a, 1b along the steering axis 5.

The first king pin 2a is rigidly mounted on a first mounting portion 1a of the axle beam 1, and the second king pin 2b is rigidly mounted on a second mounting portion 1b of the axle beam 1. The axle beam 1 is shaped such that along the steering axis 5 a clearance 7 is formed in between the first mounting portion 1a and the second mounting portion 1b or, equivalently, in between the king pins 2a, 2b. The joint 9 which drivingly connects the shafts 15a, 15b extends or reaches through the clearance 7 formed in between the mounting portions 1a, 1b of the axle beam 1 or in between the king pins 2a, 2b.

With respect to known joint assemblies for steering axles, the presently disclosed design allows increasing the distance between the joints rotatably connecting the axle beam 1 to the steering knuckle 3, thereby allowing higher loads to be placed on an axle of a given size or dimension.

In an example, the steering joint assembly of FIG. 1 may be operated in a vehicle where implements are attached to the vehicle and/or operated by the vehicle drivetrain. The vehicle may be a tractor with steered rear axles, wherein the steering joint assembly of FIG. 1 is coupled in the steered rear axle. In this example, the axle beam of the steering joint assembly of FIG. 1 may be the rear steered axle of the tractor. Further, implements may be attached to the tractor and driver through the rear drivetrain of the tractor.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A steering joint assembly, comprising an axle beam, a first king pin rigidly mounted on the axle beam, a steering knuckle, and a first spherical plain bearing rotatably connecting the first king pin to the steering knuckle, wherein the first king pin is press-fit into a first blind hole formed in the axle beam.

2. The steering joint assembly of claim 1, further comprising a second king pin rigidly mounted on the axle beam, and a second spherical plain bearing rotatably connecting the second king pin to the steering knuckle.

3. The steering joint assembly of claim 2, wherein a spherical portion of the first spherical plain bearing connected to the first king pin and a spherical portion of the second spherical plain bearing connected to the second king pin face away from one another along a steering axis defined by the first king pin and the second king pin.

4. The steering joint assembly of claim 2, wherein the first king pin is rigidly mounted on a first mounting portion of the axle beam and the second king pin is rigidly mounted on a second mounting portion of the axle beam, and wherein a clearance is formed in between the first mounting portion and the second mounting portion along a steering axis defined by the first king pin and the second king pin so that a joint may pass through the clearance.

5. The steering joint assembly of claim 4, further comprising a wheel hub rotatably mounted on the steering knuckle and a joint drivingly engaged with the wheel hub for transferring torque to the wheel hub, wherein the joint is disposed within or passes through the clearance formed in between the first mounting portion and the second mounting portion of the axle beam, and wherein the joint being a universal joint or a constant velocity joint.

6. The steering joint assembly of claim 1, wherein spherical portions of the first spherical plain bearing and/or spherical portions of the second spherical plain bearing are coated with polytetrafluoroethylene.

7. The steering joint assembly of claim 1, wherein the second king pin is rigidly mounted in a second blind hole formed in the axle beam via press-fit.

8. The steering joint assembly of claim 3, wherein the first spherical plain bearing is disposed in a first through hole formed in the steering knuckle, and/or wherein the second spherical plain bearing is disposed in a second through hole formed in the steering knuckle.

9. The steering joint assembly of claim 8, wherein an outer ring of the first spherical plain bearing and/or an outer ring of the second spherical plain bearing is/are connected to the steering knuckle.

10. The steering joint assembly of claim 8, further comprising a first cover plate rigidly connected to the steering knuckle and covering the first through hole formed in the steering knuckle, and/or further comprising a second cover plate rigidly connected to the steering knuckle and covering the second through hole formed in the steering knuckle.

11. The steering joint assembly of claim 10, wherein a surface of an outer ring of the first spherical plain bearing arranged parallel to the steering axis is connected to the steering knuckle, and a surface of the outer ring of the first spherical plain bearing arranged perpendicular to the steering axis is connected to the first cover plate, and/or wherein a surface of an outer ring of the second spherical plain bearing arranged parallel to the steering axis is connected to the steering knuckle, and a surface of the outer ring of the second spherical plain bearing arranged perpendicular to the steering axis is connected to the second cover plate.

12. A steering joint assembly, comprising:
an axle beam,
a first king pin rigidly mounted on the axle beam,
a steering knuckle,
a first spherical plain bearing rotatably connecting the first king pin to the steering knuckle, and
a second king pin rigidly mounted on the axle beam, and a second spherical plain bearing rotatably connecting the second king pin to the steering knuckle, wherein the first king pin is rigidly mounted in a first blind hole formed in the axle beam via press-fit and/or wherein the second king pin is rigidly mounted in a second blind hole formed in the axle beam via press-fit, and wherein the king pins are not fixedly mounted directly on the steering knuckle.

13. The steering joint assembly of claim 12, wherein a spherical portion of the first spherical plain bearing connected to the first king pin and a spherical portion of the second spherical plain bearing connected to the second king pin face away from one another along a steering axis defined by the first king pin and the second king pin.

14. The steering joint assembly of claim 12, wherein the first king pin is rigidly mounted on a first mounting portion of the axle beam and the second king pin is rigidly mounted on a second mounting portion of the axle beam, and wherein a clearance is formed in between the first mounting portion and the second mounting portion along a steering axis defined by the first king pin and the second king pin so that a joint may pass through the clearance.

15. The steering joint assembly of claim 14, further comprising a wheel hub rotatably mounted on the steering knuckle and a joint, such as a universal joint or a constant velocity joint, drivingly engaged with the wheel hub for transferring torque to the wheel hub, wherein the joint is disposed within or passes through the clearance formed in between the first mounting portion and the second mounting portion of the axle beam.

16. The steering joint assembly of claim 12, wherein spherical portions of the first spherical plain bearing and/or spherical portions of the second spherical plain bearing are coated with polytetrafluoroethylene.

17. The steering joint assembly of claim 12, wherein the first spherical plain bearing is disposed in a first through hole formed in the steering knuckle, and/or wherein the second spherical plain bearing is disposed in a second through hole formed in the steering knuckle.

18. The steering joint assembly of claim 17, wherein an outer ring of the first spherical plain bearing and/or an outer ring of the second spherical plain bearing is/are connected to the steering knuckle.

19. The steering joint assembly of claim 17, further comprising a first cover plate rigidly connected to the steering knuckle and covering the first through hole formed in the steering knuckle, and/or further comprising a second cover plate rigidly connected to the steering knuckle and covering the second through hole formed in the steering knuckle.

\* \* \* \* \*